United States Patent
Kuroda et al.

(10) Patent No.: US 7,356,402 B2
(45) Date of Patent: Apr. 8, 2008

(54) CONTROLLER FOR ENGINE HAVING COMPONENT

(75) Inventors: Daisuke Kuroda, Kariya (JP); Keisuke Tani, Nagoya (JP); Kazuyoshi Obayashi, Chita-gun (JP)

(73) Assignee: Denso Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/441,226

(22) Filed: May 26, 2006

(65) Prior Publication Data

US 2006/0271257 A1 Nov. 30, 2006

(30) Foreign Application Priority Data

May 31, 2005 (JP) ............................. 2005-158765

(51) Int. Cl.
*G06F 7/00* (2006.01)

(52) U.S. Cl. ........................................ 701/102; 701/36

(58) Field of Classification Search ................ 701/101, 701/102, 111, 114, 115, 29, 36, 50, 51, 54; 290/40 B, 40 C, 40 R; 180/54.1, 69.3
See application file for complete search history.

(56) References Cited

U.S. PATENT DOCUMENTS

| | | | |
|---|---|---|---|
| 4,459,489 A | | 7/1984 | Kirk et al. |
| 5,111,788 A | | 5/1992 | Washino |
| 5,644,204 A | * | 7/1997 | Nagle .................... 318/568.12 |
| 6,014,604 A | * | 1/2000 | Kuroiwa et al. ............... 701/54 |
| 6,027,425 A | * | 2/2000 | Sakaguchi et al. ............ 477/48 |
| 6,252,364 B1 | * | 6/2001 | Chiang et al. ............... 318/280 |
| 6,360,154 B1 | * | 3/2002 | Krenn et al. .................. 701/54 |
| 6,427,108 B1 | * | 7/2002 | Kanasugi et al. ............. 701/51 |
| 6,430,495 B2 | * | 8/2002 | Takaku et al. ............... 701/114 |
| 6,440,037 B2 | * | 8/2002 | Takagi et al. ................. 477/37 |
| 6,553,297 B2 | * | 4/2003 | Tashiro et al. ................ 701/48 |

(Continued)

FOREIGN PATENT DOCUMENTS

JP  64-080752  3/1989

(Continued)

OTHER PUBLICATIONS

U.S. Appl. No. 11/589,999, filed Oct. 31, 20067, inventor Kuroda et al, (not yet published).

(Continued)

*Primary Examiner*—Willis R. Wolfe
*Assistant Examiner*—Johnny H. Hoang
(74) *Attorney, Agent, or Firm*—Nixon & Vanderhye, P.C.

(57) ABSTRACT

A required-generate-current (RGC) is calculated according to conditions of the electric loads and a charging state of the battery. The required-alternator-drive-torque (RADT) is estimated according to the required-generate-current (RGC). A required engine torque is calculated by adding the required-alternator-drive-torque (RADT) and the required-vehicle-drive-torque (RVDT) together. The engine torque which is realized at next calculating timing is estimated in consideration of a response delay of the engine. The differential torque between the estimated engine torque and the required-vehicle-drive-torque (RVDT) is calculated as the permission torque. The command current corresponding to the permission torque is calculated. The control current of the alternator is controlled in such a manner as to generate current corresponding to the command current at the next calculating timing.

12 Claims, 4 Drawing Sheets

U.S. PATENT DOCUMENTS

| | | |
|---|---|---|
| 6,907,333 B2 * | 6/2005 | Iwazaki .................... 701/41 |
| 6,922,035 B2 * | 7/2005 | Hayasaka ................ 318/652 |
| 7,010,417 B2 * | 3/2006 | Edwards et al. ........... 701/110 |
| 7,096,098 B2 * | 8/2006 | Auguet et al. ............ 701/22 |
| 7,113,863 B2 * | 9/2006 | Sawada et al. ........... 701/111 |
| 7,171,292 B2 * | 1/2007 | Bellinger et al. .......... 701/29 |
| 2004/0164616 A1 | 8/2004 | Obayashi et al. |

FOREIGN PATENT DOCUMENTS

JP  2000-130203  5/2000

OTHER PUBLICATIONS

U.S. Appl. No. 11/253,669, filed Oct. 20, 2005, inventor Tani et al., English counterpart of JP 2004-356030 (not yet published).

* cited by examiner

CONTROLLER FOR ENGINE HAVING COMPONENT

CROSS REFERENCE TO RELATED APPLICATIONS

This application is based on Japanese Patent Applications No. 2005-158765 filed on May 31, 2005, the disclosure of which is incorporated herein by reference.

FIELD OF THE INVENTION

The present invention relates to a controller for an engine having at least one component. The controller controls torque of the components.

BACKGROUND OF THE INVENTION

A vehicle is provided with an engine and components driven by the engine. An alternator is one of the components driven by the engine. According as electricity generated by the alternator is increased, the engine torque which is consumed by the alternator is also increased, so that fuel consumption of the engine is increased.

JP-2004-260908A (US-2004/0164616A1) shows a system in which an electricity generation cost is calculated to intensively generate electricity in a timing in which electricity generation cost is low so that the fuel consumption is reduced.

When the alternator intensively generates electricity in a short period, the engine torque to drive the alternator is rapidly increased. Since the engine torque is controlled based on a throttle position, a fuel injection quantity, and a fuel injection timing, a responsiveness delay of the engine control arises, so that the engine torque is belatedly increased. Consequently, the torque for driving the vehicle is temporarily dropped off and the engine speed is temporarily dropped off. Thus, the drivability is deteriorated and a required electricity may be hardly obtained.

The above problem may be arisen with respect to a compressor for air-conditioner, which is one of components. When the compressor is started, the engine speed may be temporarily dropped off.

SUMMARY OF THE INVENTION

The present invention is made in view of the foregoing matter and it is an object of the present invention to restrict a fluctuation in the engine speed due to an increment/decrement in driving torque of the components.

According to a controller of the present invention, a component-drive-torque calculating means calculates a component-drive-torque which is necessary to achieve a function of the component, an engine control means adjusts an engine torque according to the component-drive-torque, and a component control means controls the component with a delay in consideration of a delay of responsiveness of the engine torque.

BRIEF DESCRIPTION OF THE DRAWINGS

The above and other objects, features, and advantages of the present invention will become more apparent from the following detailed description made with reference to the accompanying drawings, in which like parts are designated by like reference number and in which.

DETAILED DESCRIPTION OF THE PREFERRED EMBODIMENTS

Embodiments of the present invention, which is applied to a cooperative control of an engine and an alternator, will be described hereinafter with reference to the drawings.

Figure 1:
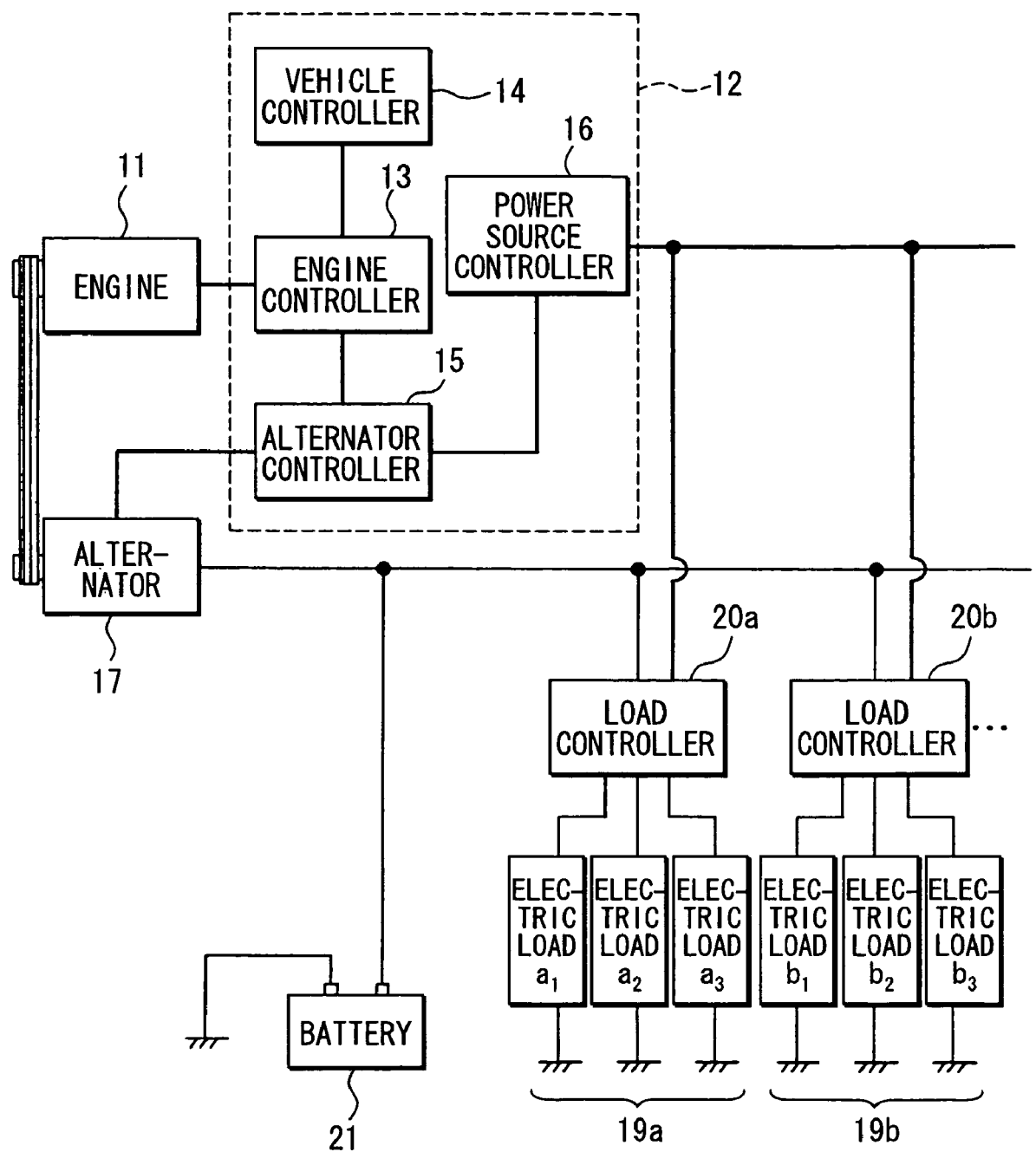
FIG. 1 is a schematic block diagram showing a system according to an embodiment of the invention.
Figure 2:
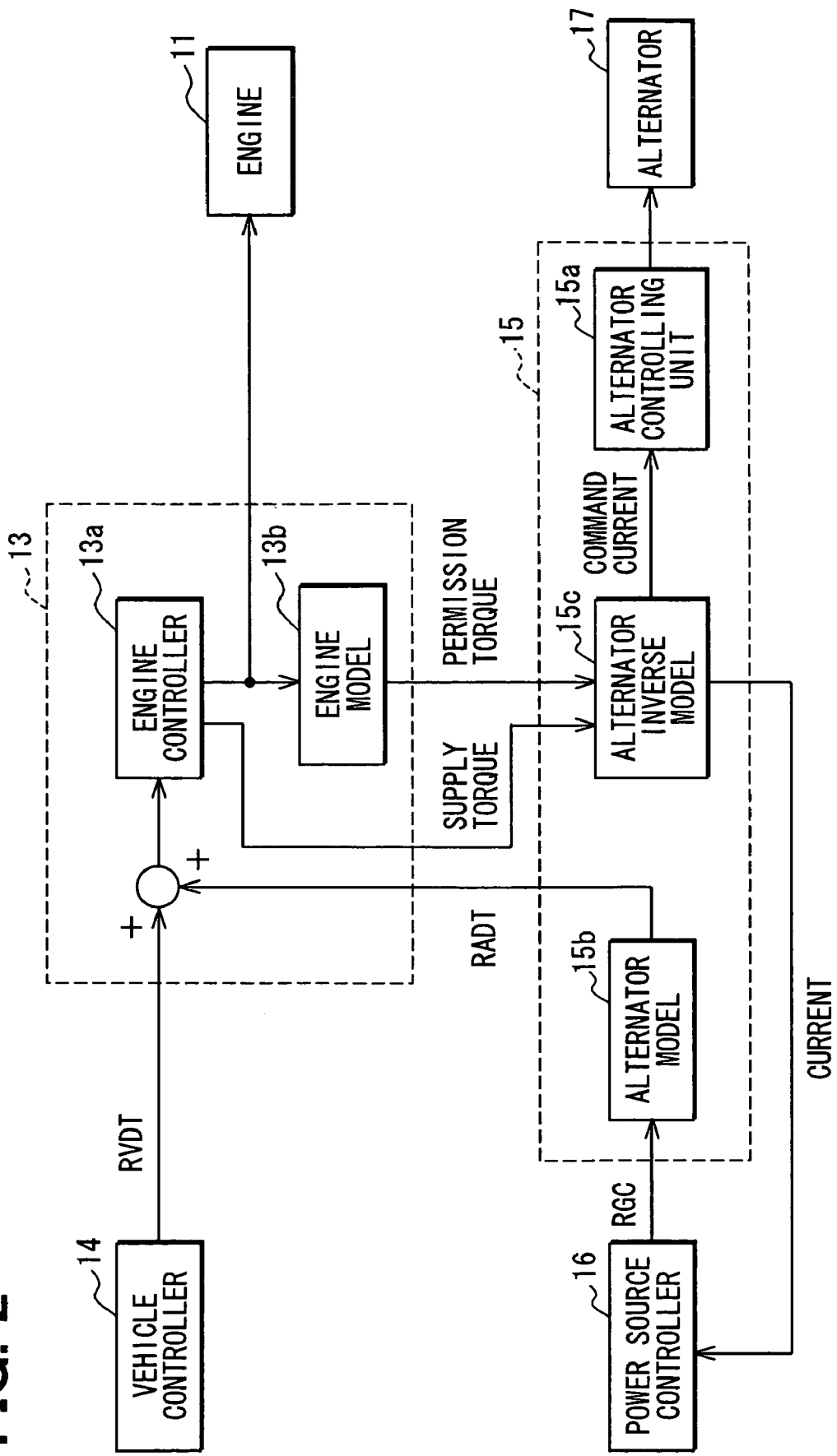
FIG. 2 is a block diagram for explaining a control function.

Referring to FIGS. 1 and 2, a schematic structure of a system is described hereinafter. An engine 11 is provided with electric equipment relating to intake air system, a fuel injection system and an ignition system. An engine controller 13 in a controlling apparatus 12 controls each electric equipment. As shown in FIG. 2, the engine controller 13 includes an engine control unit 13a and an engine model 13b which calculates a permission torque. The engine control unit 13a controls a throttle position, fuel injection quantity, an ignition timing, and the like. The controlling apparatus 12 includes a vehicle controller 14, an alternator controller 15, and a power source controller 16, each of which is connected with each other through signal lines.

The vehicle controller 14 calculates an engine torque to drive the vehicle and sends it to the engine controller 13. This engine torque is referred to as a required-vehicle-drive-torque (RVDT).

The alternator controller 15 controls current, which is generated by an alternator 17, based on the permission torque transmitted from the engine controller 13. The alternator controller 15 includes an alternator controlling unit 15a, an alternator model 15b and an alternator inverse model 15c calculating an alternator-drive-torque (ADT).

The power source controller 16 is electrically connected to the alternator controller 15 and load controllers 20a, 20b. The load controllers 20a, 20b control electric loads 19a, 19b. The power source controller 16 detects condition of the electric load 19a, 19b (consumption current) and a charging condition of a battery 21 to calculate a generating current which is required to the alternator 17. This generating current is referred to as a required-generate-current (RGC).

These controllers 13-16 can be respectively constructed by an individual microcomputer (ECU) or by a single microcomputer (ECU).

Figure 3:
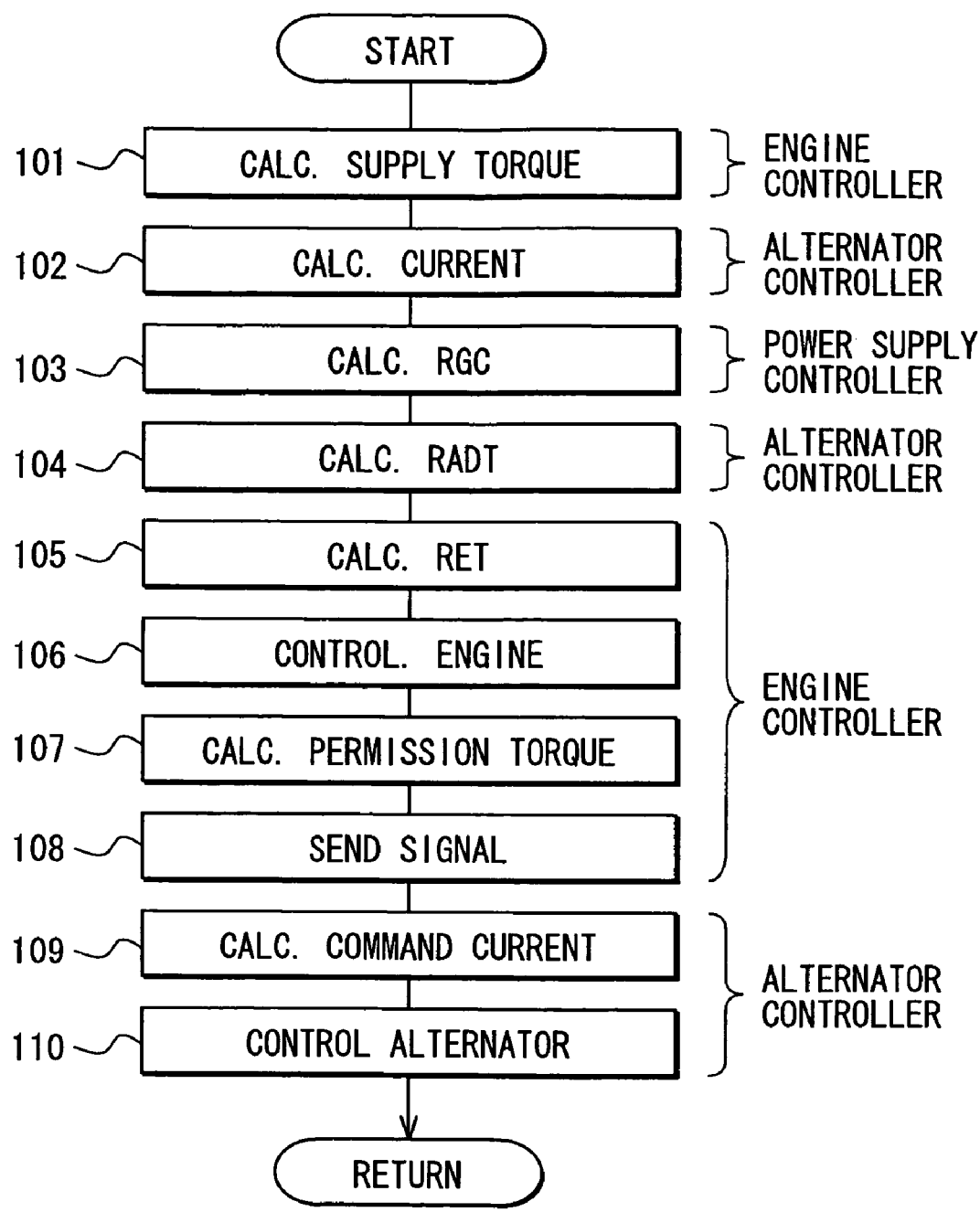
FIG. 3 is a flow chart for explaining processes of a control program.

Referring to a flowchart shown in FIG. 3, procedures executed by the controller 13-16 are described hereinafter. A control program shown in FIG. 3 is executed at a regular time intervals (for example, 8 μsec) while the engine 11 is driven. In step 101, the engine controller 13 calculates a torque which can be used to drive the alternator 17 by subtracting the required-vehicle-drive-torque (RVDT) and a predetermined margin from a maximum engine torque. This calculated torque is referred to as a supply torque. The engine controller 13 sends a signal indicative of the supply torque to the alternator controller 15. The predetermined margin is an extra torque to correspond a sudden vehicle acceleration requirement. The vehicle controller 14 calculates the required-vehicle-drive-torque (RVDT).

In step 102, the alternator controller 15 inputs the supply torque into the inverse model 15c to calculate the current which the alternator can generates. This current is referred to as an alternator-generating-current (AG-current). The alternator controller 15 sends a signal indicative of the AG-current to the power source controller 16. The inverse model 15c is a inverse model of the alternator model 15b, which calculates a generated current by use of parameters, such as the supply torque, a rotational speed of the alternator 17 (or an engine speed), and a bus voltage of the power supply.

In step 103, the power source controller 16 calculates the required-generate-current (RGC), which is within the AG-current, based on the consumption current of the electric loads 19a, 19b and the charging condition of the battery 21. The power source controller 16 sends a signal indicative of the required-generate-current (RGC) to the alternator controller 15.

In step 104, the alternator controller 15 calculates the alternator-drive-torque (ADT) which is necessary to drive the alternator 17 according to the required-generate-current (RGC) by use of the alternator model 15b. This calculated alternator-drive-torque (ADT) is referred to as a required-alternator-drive-torque (RADT). The alternator controller 15 sends a signal indicative of the required-alternator-drive-torque (RADT) to the engine controller 13. The alternator model 15b is a model which calculates the alternator-drive-torque (ADT) by use of parameters, such as the required-generate-current (RGC), the rotational speed of the alternator 17 (or an engine speed), and the bus voltage of the power supply.

In step 105, the engine controller 13 calculates the sum of the required-alternator-drive-torque (RADT) and the required-vehicle-drive-torque (RVDT) to obtain the required-engine-torque (RET).

In step 106, the engine controller 13 calculates control values, such as the throttle position, the fuel injection quantity, and the ignition timing. The engine 11 is controlled based on the control values to generate the required-engine-torque.

In step 107, the engine controller 13 inputs the required engine torque into the engine model 13b to estimate an engine torque which is realized after predetermined calculation timing. The engine controller 13 calculates the permission torque which is a differential torque between the estimated torque and the required-vehicle-drive-torque (RVDT). In step 108, the engine controller 13 sends a signal indicative of the permission torque to the alternator controller 15.

In step 109, the alternator controller 15 calculates a command current corresponding to the permission torque by use of the alternator inverse model. In step 110, a control current (field current) is controlled in such a manner that the alternator 17 generates the command current after a predetermined calculation timing.

Figure 4:
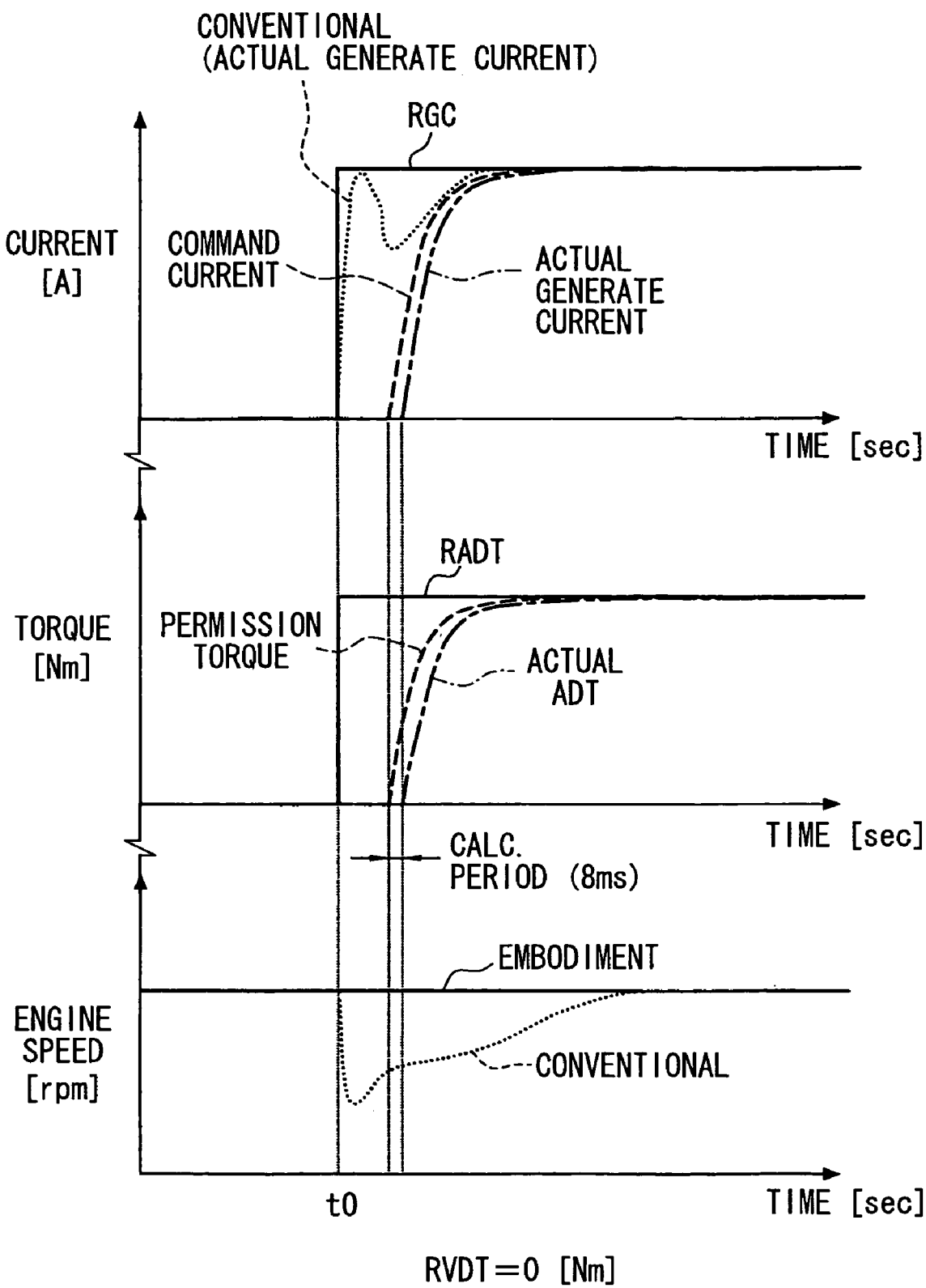
FIG. 4 is a time chart for explaining a control process.

Referring to a time chart shown in FIG. 4, an operation and effect of the present embodiment is described. In FIG. 4, the required-generate-current (RGC) is stepwise increased at a time of t0.

In a conventional system, when the required-generate-current (RGC) is stepwise increased at the time of t0, an actual generate current (output current of the alternator 17) is rapidly increased without any delay. The engine torque is increased with some delay. Hence, when the alternator-drive-torque (ADT) is increased rapidly, the engine torque has some delay. The vehicle driving torque and the engine speed Ne are temporarily dropped off, whereby the required-generate-current (RGC) is hardly obtained.

In this embodiment, the required-generate-current (RGC) is calculated according to the operational condition of the electric loads 19a, 19b and a charging condition of the battery 21. The required-alternator-drive-torque (RADT) is estimated to drive the alternator 17 according to the required-generate-current (RGC). The required engine torque is calculated by adding the required-alternator-drive-torque (RADT) and the required-vehicle-drive-torque (RVDT) together. The engine 11 is driven based on the required engine torque. The engine torque which is realized at next calculating timing is estimated based on the response delay of the engine 11. The differential torque between the estimated engine torque and the required-vehicle-drive-torque (RVDT) is calculated as the permission torque. The command current corresponding to the permission torque is calculated. The control current (field current) of the alternator 17 is controlled in such a manner as to generate current corresponding to the command current at the next calculating timing. Thereby, the variation of the actual alternator-drive-torque and the variation of the actual engine torque are synchronized with each other, so that the fluctuation of the vehicle-drive-torque (the fluctuation of engine speed) is restricted.

The engine controller 13 calculates the torque which can be used to drive the alternator 17 by subtracting the required-vehicle-drive-torque (RVDT) and a predetermined margin from a maximum engine torque. The current which the alternator can generate is calculated based on the torque which can be used to drive the alternator 17. The power source controller 16 calculates the required-generate-current (RGC), which is within the current the alternator can generate. Thus, the fluctuation of the vehicle-drive-torque (the engine speed) due to the fluctuation of the alternator-drive-torque (ADT) is restricted without deteriorating the acceleration responsiveness of the vehicle.

The system described above can be applied to a compressor for an air conditioner.

What is claimed is:

1. A controller for an engine driving a vehicle and having at least one component driven by an output torque of the engine, said controller comprising:
   a component-drive-torque calculating means for calculating a component-drive-torque necessary to achieve a function of the component;
   an engine control means for adjusting output torque of the engine according to the calculated component-drive-torque; and
   a component control means for controlling the component with a time delay corresponding to delayed responsiveness of the adjusted engine torque.

2. A controller for an engine according to claim 1, wherein:
   the component is an alternator driven by the engine torque, and
   the component control means is an alternator control means for controlling current generated by the alternator.

3. A controller for an engine according to claim 2, further comprising:
   a generate current calculating means for calculating a required-generate-current which the alternator is required to generate based on an electric load and state of battery charge,
   wherein the component-drive-torque calculating means comprises means for estimating alternator-drive-torque necessary to drive the alternator according to the required-generate-current.

4. A controller for an engine according to claim 1, wherein:
the engine control means calculates a supply torque which can be utilized to drive the component by subtracting a vehicle-drive-torque and a margin from a maximum engine torque, and
the component-drive-torque calculating means calculates the component-drive-torque within a range of torque which can be utilized to drive the component.

5. A controller for an engine according to claim 3, wherein:
the engine control means calculates a supply torque which can be utilized to drive the component by subtracting a vehicle-drive-torque and a margin from a maximum engine torque,
the alternator control means calculates a current which the alternator can generate based a supply torque which can be utilized to drive the component, and
the generate current calculating means calculates the required-generate-current within a range of current which the alternator can generate.

6. A controller for an engine according to claim 1, wherein:
the engine control means controls the engine based on a required engine torque which is a summation of the component-drive-torque and a vehicle-drive-torque necessary to drive the vehicle,
the engine control means estimates the engine torque which can be realized after predetermined calculation timing in consideration of a delay of responsiveness of the engine,
the engine control means calculates a differential torque between the estimated torque and the vehicle-drive-torque to obtain a permission torque, and
the component control means controls a drive torque of the component based on the permission torque.

7. A method for controlling the operations of an engine driving a vehicle and of at least one component driven by an output torque of the engine, said method comprising:
calculating a component-drive-torque necessary to achieve a function of the component;
adjusting output torque of the engine according to the calculated component-drive-torque; and
controlling the component with a time delay corresponding to delayed responsiveness of the adjusted engine torque.

8. The method as in claim 7 wherein:
the component is an alternator driven by the engine torque and current generated by the alternator is controlled.

9. The method as in claim 8 further comprising:
calculating a required-generate-current which the alternator is required to generate based on an electric load and state of battery charge,
wherein the component-drive-torque is calculated by estimating an alternator-drive-torque necessary to drive the alternator according to the required-generate-current.

10. The method as in claim 7 wherein:
said calculating step calculates a supply torque which can be utilized to drive the component by subtracting a vehicle-drive-torque and a margin from a maximum engine torque, and the component-drive-torque is calculated within a range of torque which can be utilized to drive the component.

11. The method as in claim 9 wherein:
a supply torque which can be utilized to drive the component is calculated by subtracting a vehicle-drive-torque and a margin from a maximum engine torque,
the alternator is controlled by calculating a current which the alternator can generate based upon the supply torque, and
the required-generate-current is calculated within a range of current which the alternator can generate.

12. The method as in claim 7 wherein:
the engine is controlled based on required engine torque which is a summation of the component-drive-torque and a vehicle-drive-torque necessary to drive the vehicle,
the engine torque which can be realized after predetermined calculation timing is calculated in consideration of a delay of engine responsiveness,
a differential torque between the estimated torque and the vehicle-drive-torque is calculated to obtain a permission torque, and
a drive torque of the component is controlled based on the permission torque.

* * * * *